(12) United States Patent
Baeumer et al.

(10) Patent No.: US 8,592,773 B2
(45) Date of Patent: Nov. 26, 2013

(54) PROCESSING ELECTRONICS AND METHOD FOR DETERMINING A COUNT RESULT, AND DETECTOR FOR AN X-RAY IMAGING DEVICE

(75) Inventors: Christian Baeumer, Hergenrath (BE); Guenter Zeitler, Aachen (DE); Klaus Juergen Engel, Aachen (DE); Christoph Herrmann, Aachen (DE); Roger Steadman Booker, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 463 days.

(21) Appl. No.: 12/679,327

(22) PCT Filed: Sep. 23, 2008

(86) PCT No.: PCT/IB2008/053863
§ 371 (c)(1),
(2), (4) Date: Jun. 20, 2011

(87) PCT Pub. No.: WO2010/043926
PCT Pub. Date: Apr. 22, 2010

(65) Prior Publication Data
US 2012/0085915 A1    Apr. 12, 2012

(30) Foreign Application Priority Data
Sep. 27, 2007  (EP) .................................... 07117322

(51) Int. Cl.
*G01T 1/24* (2006.01)
(52) U.S. Cl.
USPC .................................................... 250/370.09
(58) Field of Classification Search
USPC ..................... 250/370.01, 370.08, 370.09
See application file for complete search history.

(56) References Cited

U.S. PATENT DOCUMENTS

| 6,759,658 B2 | 7/2004 | Overdick et al. |
| 2005/0098735 A1 | 5/2005 | Heismann |

(Continued)

FOREIGN PATENT DOCUMENTS

| EP | 1231482 A2 * | 8/2002 |
| EP | 1231485 A2 * | 8/2002 |

OTHER PUBLICATIONS

Alvarez, R. E., et al.; Energy-selective Reconstructions in X-ray Computerized Tomography; 1976; Phys. Med. Biol.; 21(5)733-744.

(Continued)

*Primary Examiner* — Mark R Gaworecki

(57) ABSTRACT

The present invention relates to processing electronics (18) for a detector (12) of an X-ray imaging device (14), the processing electronics (18) with a pulse counter section (22) having at least one count output (30) and with an integrator section (24) having an intensity output (32), wherein the processing electronics (18) is adapted to be connected to a sensor (16) in such a manner that X-ray photons (58) arriving at the sensor (16) can be processed by the pulse counter section (22), by the integrator section (24), or both, and wherein the processing electronics (18) comprises a processor (34) adapted to be connected to the count output (30) and to the intensity output (32) and adapted to output a count result (K) that takes into account both count information (N) obtained at the count output (30) and intensity information (I) obtained at the intensity output (32), so that the count result (K) contains information (N) obtained from the pulse counter section (22) and information (M) obtained from the integrator section (24). The present invention further relates to a corresponding detector element (10) for a detector (12), an X-ray imaging device (14), a method for determining a count result (K) from a detector element (10), a computer program, a data carrier and a detector (12) for an X-ray imaging device (14).

20 Claims, 5 Drawing Sheets

(56) References Cited

U.S. PATENT DOCUMENTS

2006/0056576 A1 3/2006 Hoffman et al.
2007/0023669 A1 2/2007 Hefetz et al.
2009/0304149 A1 12/2009 Herrmann et al.

OTHER PUBLICATIONS

Baeumer, C., et al.; Design and test of an integrated Sigma-Delta analog-to-digital converter for X-ray Computed Tomography; 2007; Nuclear Instruments and Methods in Physics Research; 576(1)123-127.

Cajipe, V. P., et al.; Multi-Energy X-ray Imaging with Linear CZT Pixel Arrays and Integrated Electronics; 2004; IEEE Trans. on Intl. Workshop on Room-Temperature Semiconductor X-Ray and Gamma-Ray Detectors; pp. 4548-4551.

Kraft, E., et al.; Counting and Integrating Readout for Direct Conversion X-ray Imaging Concept, Realization and First Prototype Measurements; 2005; IEEE Nuclear Science Symposium Record; pp. 2761-2765.

Kruger, H., et al.; Simultaneous Photon Counting and Charge Integrating Readout Electronics for X-ray Imaging; 2006; University of Bonn; 19 pages.

Luhta, R., et al.; A new 2D-tiled detector for multislice CT; 2006; Proc. SPIE; 6142; 275.

\* cited by examiner

PROCESSING ELECTRONICS AND METHOD FOR DETERMINING A COUNT RESULT, AND DETECTOR FOR AN X-RAY IMAGING DEVICE

FIELD OF THE INVENTION

The present invention relates to processing electronics for a detector of an X-ray imaging device and a method for determining a count result from a detector element in a detector of an X-ray imaging device, a computer program, a data carrier, a detector element for a detector, an X-ray imaging device and a detector for an X-ray imaging device.

BACKGROUND OF THE INVENTION

Computer tomography (CT, also called computed tomography) has evolved into a commonly used means, when it comes to generating a three-dimensional image of the internals of an object. The three-dimensional image is created based on a large number of two-dimensional X-ray images taken around a single axis of rotation. While CT is most commonly used for medical diagnosis of the human body, it has also been found applicable for non-destructive materials testing. Detailed information regarding the basics and the application of CT, can be found in the book "Computed Tomography" by Willi A. Kalender, ISBN 3-89578-216-5.

One of the key innovative aspects in future CT and X-ray imaging is the energy-resolved counting of the photons which are let through or transmitted by the object being analyzed when being exposed to X-ray radiation. Depending on the number and energy the transmitted photons have, it can be concluded, after a slice image reconstruction step, through which types of material the X-ray beams have traveled. In particular, this allows identifying different parts, tissues and materials within a human body.

When the detection or counting of photons is referenced, it is understood, that when a photon impinges on the conversion material of a sensor, it creates a charge pulse. This charge pulse (sometimes also referred to as current pulse) is detected and the presence of a photon is concluded. The charge pulse results from a larger number of electron-hole pairs, which are generated, when an X-ray photon interacts with the sensor conversion material. Since the charge pulse that is processed corresponds to the X-ray photon, the processing of the charge pulse is also referenced as "processing an X-ray photon" or as "processing a photon".

Great interest is shown toward CT with energy-dispersive features, because it is perceived that this will enable new applications in X-ray tomographic imaging, in particular with regards to K-edge imaging of contrast agents (Gd, Au, Bi, etc.). Furthermore, energy-dispersive CT, also called Spectral-CT, allows for quantitative imaging of μ-values, while being more dose-effective than conventional X-ray CT. Simulations on a high level of abstraction show that a Spectral-CT scanner based on energy-dispersive single-quantum counting yields the best performance as of today. However, the realization of such a detector is not straight-forward and it is difficult to deal with energy-dispersive X-ray detection for a large dynamic range of X-ray intensities.

The counting of a single quantum can be handled quite well in those parts of the detector where the X-ray beam is strongly attenuated by the object to be scanned. This is due to the fact that the flux density is significantly lower than the flux density emitted from the X-ray source. However, detecting almost unattenuated radiation in counting mode presents a challenge in X-ray CT, since the scanner has to deal with more than $10^9$ quanta/mm$^2$/s. Given such a high rate of incoming photons, it becomes very difficult to differentiate the individual photons and to accurately count them.

For instance, the detector will be busy while charges are collected in the sensor and while the analog signals are processed in the electronics. This leads to a significant decrease in the event-detection efficiency. In order to address this, correction factors can be applied that are in the order of 200%. However, since the ideal correction factor required for estimating the true event rate at the detector depends on the magnitude of the incoming X-ray photon flux, accurate results cannot be expected.

Another aspect that has to be considered is known as "event pile-up", where hits of subsequent X-ray photons in the detector lead to a pile-up in the detector. This causes a distortion of the measured X-ray spectrum. Using simulations it has been shown that this effect is quite severe for high energy levels, in particular for the energy channels above 100 keV.

SUMMARY OF THE INVENTION

It is an object of the present invention to provide improved processing electronics for a detector of an X-ray imaging device, a corresponding detector element and a corresponding X-ray imaging device. It is a further object of the present invention to provide an improved method for determining a count result from a detector element in a detector of an X-ray imaging device, a corresponding computer program and a corresponding data carrier. It is yet another object of the present invention to provide an improved detector for an X-ray imaging device.

According to one aspect of the invention this object is achieved by processing electronics for a detector of an X-ray imaging device, the processing electronics with a pulse counter section having at least one count output and with an integrator section having an intensity output, wherein the processing electronics is adapted to be connected to a sensor in such a manner that X-ray photons arriving at the sensor can be processed by the pulse counter section, by the integrator section, or both, and wherein the processing electronics comprises a processor adapted to be connected to the count output and to the intensity output and adapted to output a count result that takes into account both count information obtained at the count output and intensity information obtained at the intensity output, so that the count result contains information obtained from the pulse counter section and information obtained from the integrator section.

According to another aspect of the invention this object is achieved by a detector element for a detector of an X-ray imaging device, comprising a sensor with a first sub-sensor having plurality of pixels, with a second sub-sensor and with processing electronics as mentioned above.

According to another aspect of the invention this object is achieved by an X-ray imaging device with processing electronics as mentioned above.

According to another aspect of the invention this object is achieved by a method for determining a count result from a detector element in a detector of an X-ray imaging device, comprising the steps of:

receiving at least a first signal from a sensor by a pulse counter section adapted to provide count information, receiving a second signal from the sensor by an integrator section adapted to provide intensity information, obtaining the count information, obtaining the intensity information, converting the intensity information into further count information, and deriving the count result such that it takes into account both the count information and the further count information, so that the result contains information obtained from the pulse counter section and information obtained from the integrator section.

According to another aspect of the invention this object is achieved by a computer program comprising program code means for carrying out the steps of the method mentioned above when said computer program is carried out on a computer.

According to another aspect of the invention this object is achieved by a data carrier having stored a computer program as mentioned above.

According to yet another aspect of the invention this object is achieved by a detector for an X-ray imaging device, wherein the detector comprises a first sub-detector adapted to count incoming X-ray photons and a second sub-detector adapted to sense the intensity of an incoming flux, the first sub-detector comprising a first sub-sensor having at least one pixel and the second sub-detector comprising a second sub-sensor having an absorbing substance arranged between photodiodes, wherein the first sub-detector is arranged outside a path of an incident beam directed at the pixel.

As will be described in further detail below, the present invention discloses an inventive concept on how intensity information on the incoming photon flux, which per se does not provide energy-dispersive information, can be used in order to derive energy-dispersive information and, further, how this information can be beneficially combined with the information derived from electronics operating in counting mode. Among the various new aspects the present invention brings, the following two are to be highlighted. First, it was previously believed that when working in the non-energy-dispersive mode, also called integrating mode, no energy-dispersive information can be obtained. Such information would only be available in counting mode, which however cannot be applied for a high incoming photon flux due to the problems described above. In contrast to this, the present invention has determined that even in integrating mode energy-dispersive information can be derived.

Specifically, it was determined that if the incoming photon flux is high, this means that the photon flux coming from the X-ray source was subjected only to a rather small attenuation. In turn, knowing that the attenuation was rather small, it can be concluded that the energy distribution of the photon flux, meaning what amount of energy or what amount of photons is contained in the individual energy bands, has not changed a lot in comparison to the photon flux that left the X-ray source. Finally, since the energy distribution in the photon flux coming from the X-ray source is well-known and/or can be well determined, a certain intensity measured can be mapped to a certain energy distribution and ultimately into a certain distribution of the number of photons in a given energy band. In this way, count information can be derived from the measured intensity.

The second aspect focuses on combining the count information from the pulse counter section and the further count information derived from the intensity information of the integrator section. During the making of the invention it was determined that the accuracy of the photon count decreases as the flux density (photons/mm$^2$/s) increases, while the further count information that can be derived from the intensity information increases in accuracy as the photon flux increases (due to a small or non-existent attenuation). Furthermore it was noted that while the count information obtained at high flux densities may be inaccurate, it can nevertheless be understood as an estimate of the actual count values and can be beneficially considered for the overall count result even at high intensity levels. Vice versa, even though the further count information derived from the intensity information tends to become less accurate at smaller flux densities (due to an increased attenuation), the further count information can still be considered as an estimate of the actual count value and can be beneficially considered when determining the overall count result.

In particular, the count information derived from the pulse counter section can be described as a vector N having j dimensions (count values) with j being a natural number greater than zero, in particular equal or greater than 2, $$\vec{N} = \{N_1, N_2, \ldots N_j\}, \quad [1]$$

wherein each of the components $N_i$ represents the number of photons lying in a certain energy band being defined by two energy thresholds ET:

$$N_1 : EB_0 \leq E \leq EB_1 \quad [2]$$
$$N_2 : EB_1 \leq E \leq EB_2$$
$$\ldots$$
$$N_j : EB_{j-1} \leq E \leq EB_j,$$

wherein E is the energy associated with one photon. Of course, the energy bands can be defined in many different ways, covering the whole spectrum or having certain cut-off limits, covering the spectrum continuously or leaving gaps.

Also, the further count information derived from the integrator section via the intensity information can described as a vector M having k dimensions (further count values), with k being a natural number greater than zero, in particular equal or greater than 2, $$\vec{M} = \{M_1, M_2, \ldots M_k\}, \quad [3]$$

wherein each of the components $M_i$ represents the number of photons in a certain energy band being defined by two energy thresholds ET. The definition of the energy bands is preferably the same as for the count information N. However, it is perceivable that they are chosen differently and later correlated by mapping the energy bands of the count information N onto the energy bands of the further count information M, or vice versa.

Vector M can be derived from the intensity information or intensity value I using a transfer function, preferably a mathematical function or a look-up table:

$$\vec{M} = f(I). \quad [4]$$

While k will typically be equal to j in order to facilitate dealing with the available information, it should be noted that they can also be different. If the latter is the case, mapping techniques can be used in order to translate a vector having k components into a vector having j components, and vice versa.

Further, in order to consider a situation of varying flux densities coming from the X-ray source, a primary intensity $I_0$, in particular the intensity without attenuation by an object, can be considered in the transfer function:

$$\vec{M} = f(I, I_0) = \{M_1, M_2, \ldots M_k\}, \quad [5]$$

The transfer function f can be determined in different ways. First, the transfer function f can be measured using a physical test object, also called phantom. Second, the transfer function f can be derived from simulations of phantoms. In addition, system-specific adaptations and corrections can be applied when designing the function f.

The count result, vector K, is determined based on the count information N and the further count information M and has preferably the same number of dimensions (count result values) as N and/or M, in particular equal or greater than 2, $$\vec{K}=g(\vec{M},\vec{N}). \quad [6]$$

Preferably, the dimensions, or in other words the number of values contained in each vector, or even put differently, the number of energy bands represented by each vector M, N, K is the same in order to allow for a simplified processing.

In general, the first and second signals do not have to be the same, even though they are generated by the same incoming photon flux. A difference between these signals can occur in particular, if the pulse counter section is connected to a part of the sensor that is specifically adapted to provide count information and when the integrator section is connected to a part of the sensor that is specifically adapted to provide intensity information. Then, even though the physical cause for the generation of the signals (the photon flux) is the same, the signals can be different.

The invention is preferably applied in an X-ray detector for CT that employs a plurality of detector elements being arranged in a single row or as an array. The present invention can be used in connection with methods that base only on counting or only on integrating. This can be easily achieved by disregarding the count information N or the further count information M. However, it is explicitly pointed out that the concept of the present invention is fundamentally different from hybrid detectors, e.g. as shown in US 2007/0023669, that can be switched between counting mode and integrating mode, since the inventions offers an approach on how to derive further count information from intensity measurements and, further, shows how to beneficially combine this further count information with the count information from the pulse counting.

The term "processor" is to be understood in a sense that it comprises any device that is capable of providing the functionality required to implement the invention, in particular ASICs, FPGAs, CPLDs, microcontrollers or microprocessors.

In a preferred embodiment the first signal is the same as the second signal.

If the first and the second signal are the same, the design of the corresponding detector and the application of the method are facilitated. Depending on the implementation a signal from the sensor is either split into a first signal and a second signal or the signal, which can be referred to as the first signal, is duplicated to provide a second signal.

In a further preferred embodiment the processor is adapted to obtain the count result by weighing the count information versus the further count information.

As discussed above, the accuracy of the count information is better for lower densities of the photon flux, while the further count information derived from the intensity information is better for higher densities of the photon flux. It is therefore preferable to consider the count information with a higher weight and the further count information at a lower weight for smaller densities of the photon flux, and vice versa. In a further preferred embodiment the processor is adapted to perform the weighing by multiplying the count information with a first weight,
multiplying the further count information with a second weight, adding the products resulting from the multiplying.

This allows for a quick and easy to implement realization of the weighing of the count information and the further count information. Putting it into mathematical terms the count result is determined as $$\vec{K}=g(\vec{M},\vec{N})=w_1 \cdot \vec{M}+w_2 \cdot \vec{N}. \quad [7]$$

In a further embodiment the processor is adapted to increase the first weight when at least one of the conditions of a reduced count value and a reduced intensity value is present and/or to decrease the first weight when at least one of the conditions of an increased count value and an increased intensity value is present.

The weights, also called weighing coefficients, preferably range between 0 and 1. The first weight is the lowest at a low incoming photon flux and the highest at a high incoming photon flux. The second weight is the lowest for a high incoming photon flux and the highest for a low photon flux.

Using this relationship, the first weight can be dynamically adjusted. Taken, for example, that one count value, a plurality of count values or all count values contained in the count information are reduced, this gives an indication that the incoming photon flux has a density that is preferably analyzed using the count mode. In order to achieve this, the first weight is increased. On the other hand, for example, if the intensity value increases, the incoming photon flux is more effectively processed in integrating mode. Therefore, the first weight is decreased.

In a preferred embodiment the processor is adapted to calculate the second weight as the difference between the numerical value 1 and the first weight.

This ensures that if vectors M and N contain true estimates of the photon count, meaning no additional offset of factor has to be considered, the result from equation [7] will again be a true estimate that requires no additional offset of factor. Putting it into mathematical terms the count result is determined as $$\vec{K}=g(\vec{M},\vec{N})=w_1 \cdot \vec{M}+(1-w_1) \cdot \vec{N}. \quad [8]$$

Of course, if desired an offset and/or a factor for correction can still be applied to the count result.

In a further embodiment the processor is adapted to derive the first weight as a value of a function that receives as an input at least one variable from the group consisting of count information, intensity information, further count information and a primary intensity value.

This allows for a highly dynamical adaptation of the weights (or one of the weights, if desired in a specific situation) as the incoming photon flux changes. It is preferred to consider the count information N, the intensity information I and the primary intensity $I_0$ when determining the weights:

$$\vec{K}=g(\vec{M},\vec{N})=w_1(\vec{N},I,I_0) \cdot \vec{M}+(1-w_1(\vec{N},I,I_0)) \cdot \vec{N}. \quad [9]$$

In a further preferred embodiment the function is a sigmoid function or has a shape like a sigmoid function.

The sigmoid function addresses both low fluxes and high fluxes as well as the transitioning region between low flux and high flux providing good results.

In a further preferred embodiment the count result K is a vector with 2 or more dimensions representing count result values for 2 or more energy bands.

While it is possible that the count result is a single value, or a one-dimensional vector, containing information with regards to one energy band, it is preferred that the count result contains count result values for 2 or more energy bands. The number of dimensions of vector K does not have to match the number of energy bands, since it is perceivable that vector K can contain additional information besides the count result values. However, it is preferred that the number of dimensions of vector K is equal to the number of energy bands to be processed.

The detector of the present invention represents an independent inventive concept that can also be used without the processing electronics mentioned above and/or without the method mentioned above. However, the detector is preferably used in combination with the processing electronics mentioned above and/or by applying the method mentioned above. The detector allows for an unobstructed counting of incoming X-ray photons by the second sub-detector while at the same time providing intensity information based on the first sub-detector. Since the area of the first sub-detector and of the second sub-detector (seen perpendicular to the direction of the incoming photon flux) is known, e.g. the first sub-detector represents 20% of this area while the second sub-detector represents 80% of this area, the obtained intensity and count information can be corrected, e.g. by multiplication, as required.

These and other aspects of the invention will be apparent from and elucidated with reference to the embodiments described hereinafter.

It is to be understood that the features mentioned above and those yet to be explained below can be used not only in the respective combinations indicated but also in other combinations or as isolated features, without leaving the scope of the present invention.

BRIEF DESCRIPTION OF THE DRAWINGS

Embodiments of the invention are shown in the drawings and will be explained in more detail in the description below with reference to the same, in which.

DETAILED DESCRIPTION OF EXEMPLARY EMBODIMENTS

Figure 1:
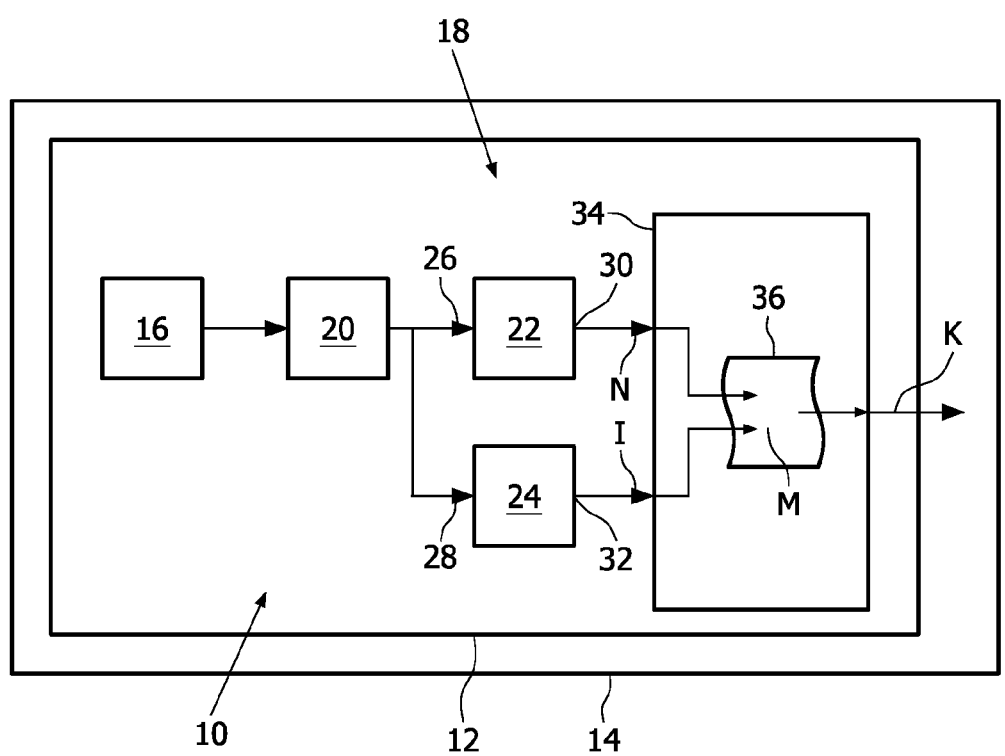
FIG. 1 shows a detector element for a detector of an X-ray imaging device, according to the present invention.

FIG. 1 shows a detector element 10 of a plurality of detector elements that are comprised in a detector 12 of an X-ray imaging device 14. The detector element 10 comprises a sensor 16 and processing electronics 18. The processing electronics 18 comprises a preamplifier 20, a pulse counter section 22 and an integrator section 24. The pulse counter section 22 is adapted to process a first signal 26 caused by photons impinging on the sensor 16 and to provide count information N at a count input 30. The integrator 24 section is adapted to process a second signal 28 caused by photons impinging on the sensor 16 and to output intensity information I at the intensity output 32. As can be seen in this embodiment, the sensor 16, the pulse counter section 22 and the integrator section 24 are connected in such a manner that the same X-ray photons impinging on the sensor can be processed by the pulse counter section 22 and by the integrator section 24. Of course, in case it is desired, additional modes can be provided, where photons are processed only by the pulse counter section 22 or only by the integrator section 24.

The integrator section 24 for readout in integrating mode is preferably realized according to the TACH principle, which is sometimes referred to as "ratiometric A/D conversion". The TACH multi-pixel readout ASIC works essentially according to the principle of current-to-frequency conversion. Inflowing current is subdivided into discrete charge packets. These packets are counted. A time-to-digital converter measures the effective time duration of the charge-packet counting. Technically this is realized by a high-frequency clock and a time counter. The ratio of the number of charge packets and the effective counting time is a measure of the sensor current, i.e. it is a measure of the X-ray intensity.

The processing electronics 18 comprises a processor 34 adapted to be connected to the count output 30 and to the intensity output 32. In order to process photons according to the present invention, it is preferred that the processor 34 is connected to both the count output 30 and the intensity output 32 at all times. However, this is not a strict necessity, since it would be sufficient to connect the processor 34 to the count output 30 and/or the intensity output 32 if count information N and/or intensity information I is to be obtained from the pulse counter section 22 and/or the integrator section 24, respectively.

The processor 34 is adapted to output a count result K (symbolized by the corresponding arrow) that takes into account both count information N (symbolized by the corresponding arrow) obtained at the count output 30 and intensity information I (symbolized by the corresponding arrow) at the intensity output 32. The capability of the processor 34 to do this processing is symbolized by the program symbol 36. It should be noted, however, that any practical means to process the information in this manner can be applied, realized via hardware, via software or via a combination of hardware and software.

The processor 34 processes the count information N and the intensity information I in such a manner that the count result K contains information N obtained from the pulse counter section 22 and information I obtained from the integrator section 24.

Figure 2:
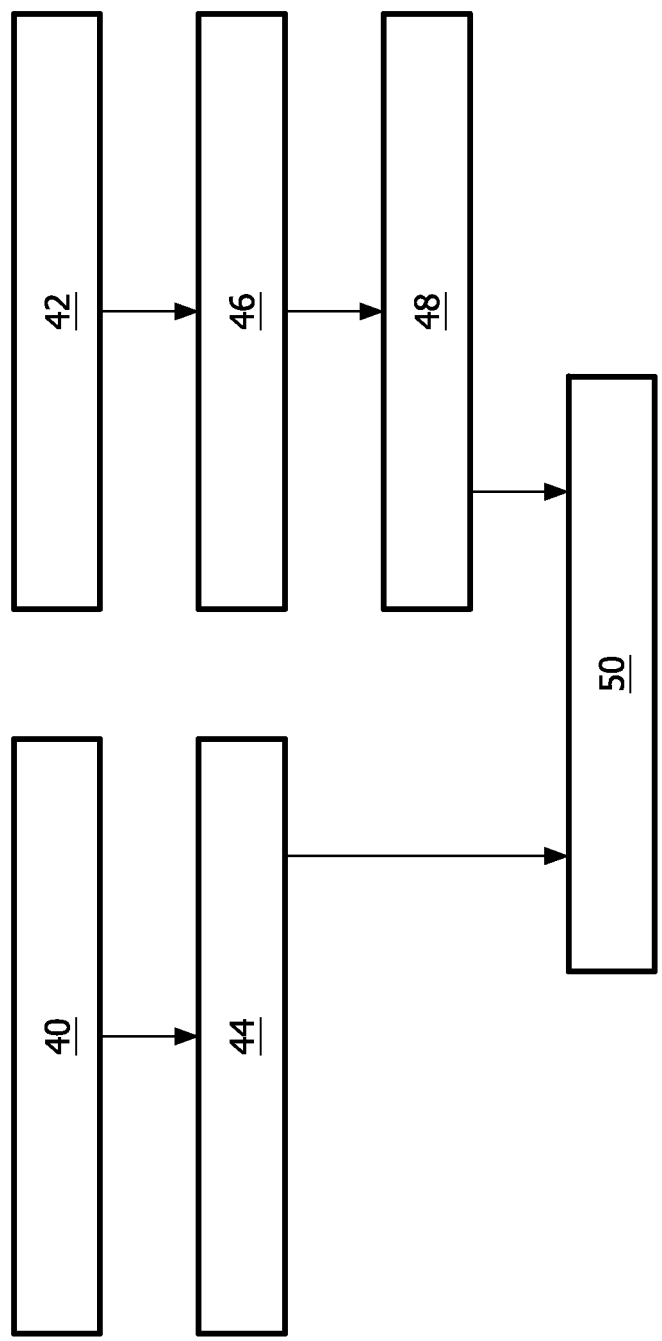
FIG. 2 shows a method for determining a count result from a detector element in a detector of an X-ray imaging device, according to the present invention.

FIG. 2 shows an implementation of a method for determining a count result K from a detector element 10 in a detector 12 of an X-ray imaging device 14. The method comprises the following steps:

receiving (step 40) at least a first signal 26 from a sensor 16 by a pulse counter section 22 adapted to provide count information N, receiving (step 42) a second signal 28 from the sensor 16 by an integrator section 24 adapted to provide intensity information I, obtaining (step 44) the count information N, obtaining (step 46) the intensity information I, converting (step 48) the intensity information I into further count information M, and deriving (step 50) the count result K such that it takes into account both the count information N and the further count information M, so that the count result K contains information N obtained from the pulse counter section 22 and information M obtained from the integrator section 24.

Figure 3:
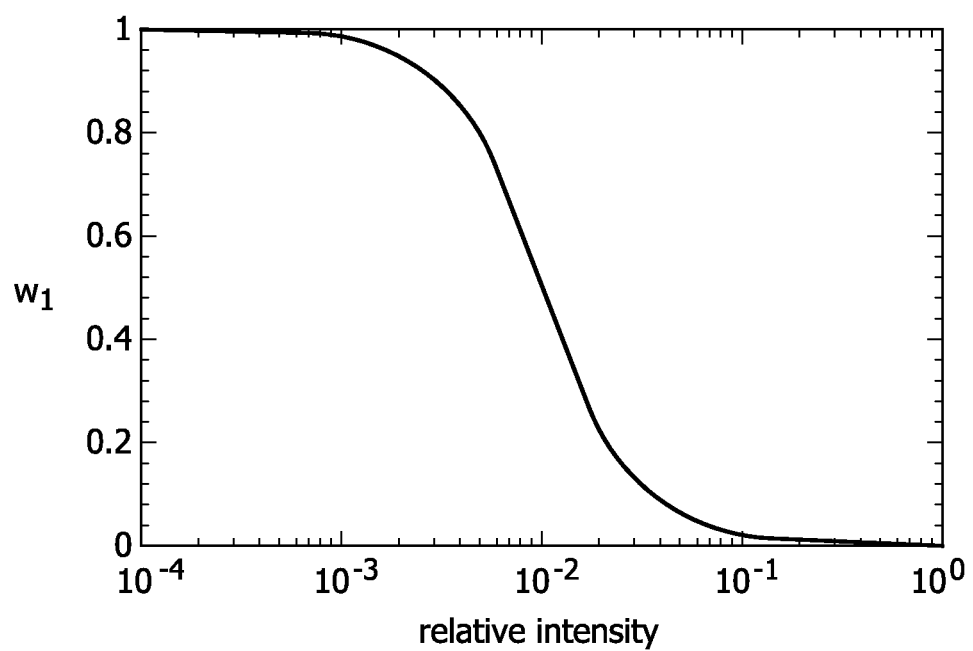
FIG. 3 shows the sigmoid function that is preferably used in order to determine the weights.

FIG. 3 shows a preferred implementation, where the first weight $w_1$ is represented as a weighing function $w_1$—here as a sigmoid function that bases on the relative intensity $I/I_0$ of the incoming photons:

$$w_1 = f(I, I_0) = f(t) = sig(t) = \frac{1}{1+e^{-t}}, \quad [10]$$

$$\text{where } t = a \cdot \left( \log\left(\frac{I}{I_0}\right) + b \right), \quad [11]$$

with a and b being constants of the order of 1. When the relative intensity is low, e.g. $I<10^{-3}$, the first weight $w_1$ is very high, and the second weight $w_2$—considering equation [9]—is very small, so that, practically, only the count information N is considered. In an intermediate range, e.g. $5*10^{-3}<I<5*10^{-2}$, both the count information N and the further count information M contribute notably. And, finally, when the relative intensity is high, e.g. $I>10^{-1}$, the first weight $w_1$ is very small and the second weight $w_2$ is very high, so that, practically, only the further count information M is considered.

Figure 4:
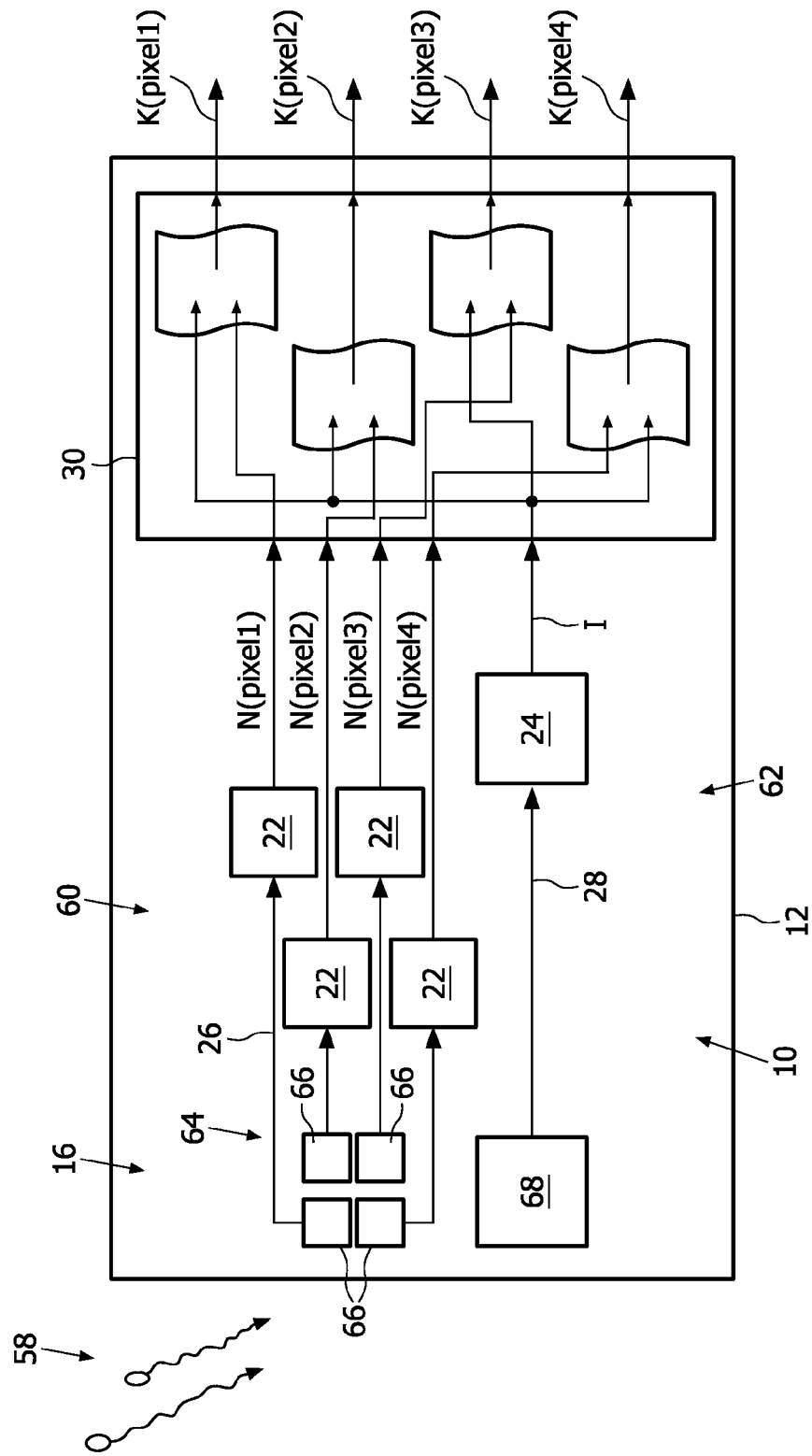
FIG. 4 shows an alternative embodiment of a detector element according to the present invention, comprising separate sub-detectors for obtaining intensity information and count information.

FIG. 4 shows a further embodiment of the detector element 10 according to the present invention. Since this detector element 10 has several commonalities with the detector element 10 shown in FIG. 1, reference is made to the explanations given in the context of FIG. 1, so that only the differences will be explained.

While FIG. 1 has shown a detector element 10 that basically represents one pixel of a detector 12, the detector 12 of FIG. 4 provides a plurality of pixels and comprises a first sub-detector 60 adapted to count incoming X-ray photons 58 and a second sub-detector 62 adapted to sense the intensity of incoming photons 58. The first sub-detector 60 comprises a sub-sensor 64 having four pixels 66. The second sub-detector 62 comprises a second sub-sensor 68.

For each of the pixels 66 there is a first signal 26 going to the respective pulse counter section 22 which provides count information N for the respective pixel 66, in particular N(pixel1), N(pixel2), N(pixel3), N(pixel4). A second signal 28 is routed from the second sub-sensor 68 to the integrator section 24 which in turn provides intensity information I.

The available information N, I and the resulting further count information M is processed by the processor 30 for each pixel, which can be done in parallel, in series or as a combination of parallel and in series processing, so that for each pixel 66 a count result K is found, in particular K(pixel1), K(pixel2), K(pixel3), K(pixel4). The advantage of this embodiment is that a sensor 16 contains two sub-sensors 64, 68 that are designed to provide accurate count information or accurate intensity information, respectively.

Figure 5:
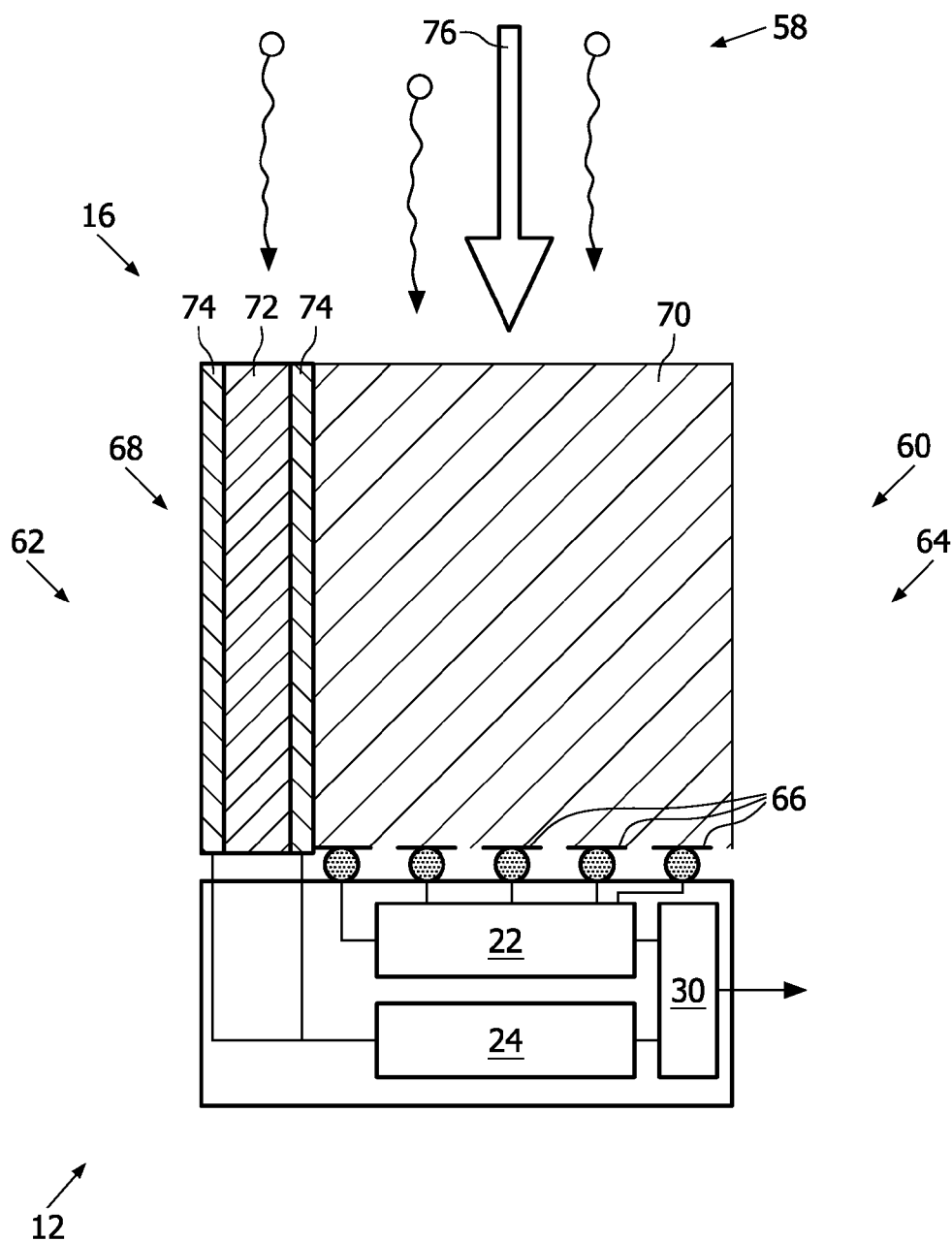
FIG. 5 shows an embodiment of a detector for an X-ray imaging device, according to the present invention.

FIG. 5 shows a detector 12 in cross-section for an X-ray imaging device 14 that is preferably used in the connection with the embodiment of the detector element 10 as shown in FIG. 4. The detector 12 comprises a first sub-detector 60 that has a first sub-sensor 64, which is adapted to count incoming X-ray photons 58. The first sub-sensor 64 comprises a detection material 70, in particular Cadmium Zinc Telluride (CZT), and an array of pixels 66.

The detector 12 comprises a second sub-detector 62 that has a second sub-sensor 68 which is adapted to sense the intensity of incoming X-ray photons 58. The second sub-detector 62, in particular the second sub-sensor 68, comprises an absorbing substance 72 arranged between two photodiodes 74. As can be seen from this figure, the second sub-sensor 68 is arranged outside a path 76 of incident photons 58 directed at the first sub-sensor 64. The absorbing substance 72 of the second sub-sensor 68 is preferably GOS. The sub-sensors 64, 68 are in edge-on configuration, which means that the photodiodes 74 are parallel to the direction of the incoming photons 58. The first sub-detector 60 is preferably a CZT sensor and an ASIC for single-quantum operation with energy information.

In summary, energy-dispersive X-ray photon counting detectors are a key component for spectral-CT imaging devices. Direct beam conditions pose high requirements for such detectors. For instance, event pile-up and reduced counting efficiency may be inevitable at high incoming X-ray fluxes and elaborated correction schemes are typically required. In contrast, detectors operating in integrating mode provide a good estimate of the X-ray intensity at high beam fluxes, but energy discrimination is not possible. The invention has determined that this is, however, only of minor importance, since in the case of high X-ray fluxes at the detector, the energy imprint of the object on the X-ray beam is small and the energy spectrum of the X-ray beam is, thus, close to the spectrum of the X-ray source.

The present invention describes a hybrid detector for spectral imaging which mainly employs the energy-discriminating feature of the counting detector part at lower and medium X-ray fluxes and mainly the integrating detector part for high X-ray fluxes. This implies that the (typically highly distorted) counting detector information at high X-ray fluxes is only of minor importance or no longer required for spectral-CT imaging. Thus, for example allowing to practically disregard the counting detector part of the hybrid spectral-CT detector when the X-ray flux goes beyond a certain level.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The terms "left", "right", etc. are used only for an eased understanding of the invention and do not limit the scope of the invention.

The mere fact that certain measures are recited in mutually different dependent claims does not indicate that a combination of these measures cannot be used to advantage. Any reference signs in the claims should not be construed as limiting the scope.

The invention claimed is:

1. Processing electronics for a detector of an X-ray imaging device, the processing electronics with a pulse counter section having at least one count output and with an integrator section having an intensity output,
    wherein the processing electronics is connected to a sensor in such a manner that X-ray photons arriving at the sensor can be processed by the pulse counter section, by the integrator section, or both, and
    wherein the processing electronics comprises a processor connected to the count output and to the intensity output and outputs a count result that takes into account both count information obtained at the count output and intensity information obtained at the intensity output, so that the count result contains information obtained from the pulse counter section and information obtained from the integrator section.

2. The processing electronics according to claim 1, wherein the processing electronics receive a first signal from the sensor by the pulse counter section to provide the count information and receive a second signal from the sensor by the integrator section to provide intensity information, and the first signal is the same as the second signal.

3. The processing electronics according to claim 1, wherein the processing electronics convert the intensity information into further count information and the processor obtains the count result by weighing the count information versus the further count information.

4. The processing electronics according to claim 3, wherein the processor performs weighing by:
   multiplying the count information with a first weight,
   multiplying the further count information with a second weight,
   adding the products resulting from the multiplying.

5. The processing electronics according to claim 4, wherein the processor increases the first weight when at least one of the conditions of a reduced count value and a reduced intensity value is present and/or to decrease the first weight when at least one of the conditions of an increased count value and an increased intensity value is present.

6. The processing electronics according to claim 4, wherein the processor calculates the second weight as the difference between the numerical value 1 and the first weight.

7. The processing electronics according to claim 4, wherein the processor derives the first weight as a value of a function that receives as an input at least one variable from the group consisting of count information, intensity information, further count information and a primary intensity value.

8. The processing electronics according to claim 7, wherein the function is a sigmoid function.

9. The processing electronics according to claim 3, wherein an accuracy of the further count information increases as photon flux increases.

10. The processing electronics according to claim 3, wherein the further count information provides an estimate of an actual count value.

11. The processing electronics according to claim 3, wherein the further count information is derived by mathematical function or form a look-up table.

12. The processing electronics according to claim 1, wherein the count result is a vector with two (2) or more dimensions representing count result values for two (2) or more energy bands.

13. A detector element for a detector of an X-ray imaging device, comprising a sensor with a first sub-sensor having plurality of pixels, with a second sub-sensor and with processing electronics according to claim 1.

14. An X-ray imaging device with processing electronics according to claim 1.

15. A method for determining a count result from a detector element in a detector of an X-ray imaging device, comprising the steps of:
   receiving at least a first signal from a sensor by a pulse counter section that provides count information,
   receiving a second signal from the sensor by an integrator section that provides intensity information,
   obtaining the count information,
   obtaining the intensity information,
   converting the intensity information into further count information, and
   deriving the count result such that it takes into account both the count information and the further count information, so that the count result contains information obtained from the pulse counter section and information obtained from the integrator section.

16. The method according to claim 15, further comprising:
   converting the intensity information into further count information;
   deriving a first weight as a value of a sigmoid function that receives as an input at least one variable from a group consisting of count information, intensity information, further count information and a primary intensity value;
   multiplying the count information with the first weight;
   multiplying the further count information with a second weight;
   adding the products resulting from the multiplying.

17. The method according to claim 15, wherein the count result is a vector with two (2) or more dimensions representing count result values for two (2) or more energy bands.

18. A non-transitory computer readable medium encoded with a computer program, which, when executed by a computer processor, causes the processor to:
   receive a first signal from a sensor by a pulse counter section that provides count information,
   receive a second signal from the sensor by an integrator section that provides intensity information,
   convert the intensity information into further count information, and
   derive the count result such that it takes into account both the count information and the further count information, so that the count result contains information obtained from the pulse counter section and information obtained from the integrator section.

19. The non-transitory computer readable medium according to claim 18, wherein executing the computer program further causes the computer processor to:
   convert the intensity information into further count information;
   derive a first weight as a value of a sigmoid function that receives as an input at least one variable from a group consisting of count information, intensity information, further count information and a primary intensity value;
   multiply the count information with the first weight;
   multiply the further count information with a second weight;
   add the products resulting from the multiplying.

20. The non-transitory computer readable medium according to claim 18, wherein the count result is a vector with two (2) or more dimensions representing count result values for two (2) or more energy bands.

* * * * *